(12) United States Patent
Yang (10) Patent No.: US 11,359,804 B2
(45) Date of Patent: Jun. 14, 2022

(54) DECORATIVE STONE PANEL (71) Applicant: Jianqiao Yang, North York (CA)

(72) Inventor: Jianqiao Yang, North York (CA)

( * ) Notice: Subject to any disclaimer, the term of this patent is extended or adjusted under 35 U.S.C. 154(b) by 66 days.

(21) Appl. No.: 16/970,594

(22) PCT Filed: Dec. 12, 2018

(86) PCT No.: PCT/CN2018/120424
§ 371 (c)(1),
(2) Date: Aug. 17, 2020

(87) PCT Pub. No.: WO2019/161698
PCT Pub. Date: Aug. 29, 2019

(65) Prior Publication Data
US 2020/0378592 A1 Dec. 3, 2020

(30) Foreign Application Priority Data

Feb. 23, 2018 (CN) .......................... 201820262451.6
Oct. 26, 2018 (CN) .......................... 201821749080.0
Nov. 12, 2018 (CN) .......................... 201821858850.5

(51) Int. Cl.
*F21V 33/00* (2006.01)
*F21V 9/30* (2018.01)
(Continued)

(52) U.S. Cl.
CPC ............ *F21V 33/0004* (2013.01); *B32B 3/12* (2013.01); *B32B 3/30* (2013.01); *B32B 7/12* (2013.01); *B32B 9/002* (2013.01); *B32B 9/005* (2013.01); *B32B 13/04* (2013.01); *E04F 13/074* (2013.01); *E04F 13/077* (2013.01);
(Continued)

(58) Field of Classification Search
CPC ....... B32B 13/04; B32B 2451/00; B32B 3/12; B32B 3/30; B32B 7/12; B32B 9/002; B32B 9/005; E04F 13/074; E04F 13/077; E04F 13/147; E04F 15/082; F21V 33/0004; F21V 9/08; F21V 9/30
See application file for complete search history.

(56) References Cited

U.S. PATENT DOCUMENTS

2016/0320048 A1* 11/2016 Daniels .................... F21S 2/00

FOREIGN PATENT DOCUMENTS

| CN | 1249243 A | 4/2000 |
|----|-----------|--------|
| CN | 2578115 Y | 10/2003 |

(Continued)

*Primary Examiner* — Britt D Hanley (57) ABSTRACT

A decorative stone panel is provided, which comprises a natural stone panel (1), a ceramic tile (4), a light source (2) and curable transparent adhesive resin (3). The ceramic tile (4) is bonded to the inner surface of the natural stone plate (1). Counter-relies (9) are provided on the inner surface of the natural stone plate (1). The stone thickness at the bottom of the counter-reliefs (9) is 1 mm to 3.5 mm. The counter-reliefs (9) form a counter-relief figure. A cavity is provided between the counter-reliefs (9) and the body of the ceramic tile (4). The light source (2) is provided within the cavity. The cavity is also filled with curable transparent adhesive resin (3) on the side of the counter-reliefs (9) The decorative panel has good light transmitting properties and the light-transmitting surface is less prone to damage.

20 Claims, 7 Drawing Sheets

(51) Int. Cl.
*B32B 3/12* (2006.01)
*B32B 3/30* (2006.01)
*B32B 7/12* (2006.01)
*B32B 9/00* (2006.01)
*B32B 13/04* (2006.01)
*E04F 13/074* (2006.01)
*E04F 13/077* (2006.01)
*E04F 13/14* (2006.01)
*E04F 15/08* (2006.01)
*F21V 9/08* (2018.01)
*F21Y 115/10* (2016.01)

(52) U.S. Cl.
CPC .......... *E04F 13/147* (2013.01); *E04F 15/082* (2013.01); *F21V 9/08* (2013.01); *F21V 9/30* (2018.02); *B32B 2451/00* (2013.01); *F21Y 2115/10* (2016.08)

(56) References Cited

FOREIGN PATENT DOCUMENTS

| | | |
|---|---|---|
| CN | 1583429 A | 2/2005 |
| CN | 102254907 A | 11/2011 |
| CN | 202055438 U | 11/2011 |
| CN | 103806633 A | 5/2014 |
| CN | 103938816 A | 7/2014 |
| CN | 206034831 U | 3/2017 |
| CN | 107150548 A | 9/2017 |
| CN | 108045151 A | 5/2018 |
| CN | 208184133 U | 12/2018 |
| DE | 102014117273 A1 | 5/2016 |
| EP | 538376 B1 | 6/1996 |
| ES | 2023742 A6 | 2/1992 |
| KR | 20090099598 A | 9/2009 |

* cited by examiner

DECORATIVE STONE PANEL

CROSS-REFERENCE TO RELATED APPLICATIONS

This application is a U.S. National Phase Application under 35 U.S.C. 371 of International Application No. PCT/CN2018/120424 filed Dec. 12, 2018, which claims priority from the following applications:
Chinese Patent Application No. CN 201820262451.6, filed on Feb. 23, 2018, entitled "Tile with Natural Stone Surface";
Chinese Patent Application No. CN 201821749080.0, filed on Oct. 26, 2018, entitled "Decorative Natural Stone Panel"; and
Chinese Patent Application No. CN 201821858850.5, filed on Nov. 12, 2018, entitled "Floor Tile";
the entire contents of each of the prior applications are incorporated herein by reference.

FIELD OF THE DISCLOSURE

The present invention relates to the technical field of decorative construction, in particular to decorative stone panel.

BACKGROUND

Consumers prefer natural stone products as natural stones provide good decorative effects. Particularly, some people favor translucent decorative natural stone products due to their enhanced decorative effects. Most natural stone materials become light transmissive or have improved light transmission only after they have been processed to a reduced thickness. However, during the process of thinning a natural stone panel, the stone panel's light transmissive surface is prone to damage and can easily break, resulting in low product yield and waste of natural stones.

SUMMARY

The present disclosure aims to overcome the aforementioned technical deficiencies and discloses a decorative stone panel for solving the technical problem that the light-transmissive surface of a natural stone panel is prone to damage during a conventional stone thinning process.

To achieve the above technical objective, the present disclosure provides a decorative stone panel, including a natural stone panel, a ceramic tile, a light source, and curable transparent adhesive resin; the ceramic tile adhered to an inner surface of the natural stone panel; the natural stone panel comprising a plurality of third counter-reliefs at the inner surface of the natural stone panel, a thickness of stone material at a bottom of the third counter-reliefs being from 1 mm to 3.5 mm; the plurality of third counter-reliefs forming a figure; the third counter-reliefs and the ceramic tile defining a cavity therebetween filled with the curable transparent adhesive resin adjacent to the third counter-reliefs; the light source being disposed in the cavity and connected with electric wires; wherein the figure is invisible when the light source in the cavity is not emitting light and is visible when the light source in the cavity emits light.

Preferably, the ceramic tile may have a second groove opposite to the third counter-reliefs, and the light source is disposed in the second groove.

Preferably, the ceramic tile may comprise a plurality of ceramic tiles each corresponding to one of the plurality of third counter-reliefs and being disposed at an opening of the corresponding third counter-relief.

Preferably, the decorative stone panel may comprise a pigment layer between the curable transparent adhesive resin and the light source.

Preferably, the decorative stone panel may comprise a light-transmissive colored plate between the third counter-reliefs and the light source.

Preferably, the decorative stone panel may comprise a photoluminescent material in the third counter-reliefs, wherein when the light source in the cavity is not emitting light and/or the photoluminescent material in the third counter-reliefs has not been activated to emit light, the figure is invisible; and when the light source in the cavity is emitting light and/or the photoluminescent material in the third counter-reliefs has been activated to emit light, the figure is visible.

Preferably, the ceramic tile may comprise a notch or a drill hole, and the electric wires may be connected to a power source through the notch or the drill hole.

Preferably, the natural stone panel may have a flat outer surface.

Preferably, the decorative stone panel may comprise a heating unit in the third counter-reliefs and/or the second groove.

To achieve the above technical objective, the present disclosure also provides a decorative stone panel, comprising a natural stone panel, a rear panel, a light source, and curable transparent adhesive resin; the natural stone panel comprising a plurality of first grooves or first sunk-reliefs at an outer surface of the natural stone panel, and comprising a flat surface at an inner surface of the natural stone panel; the inner surface of the natural stone panel bonded to the rear panel; the rear panel comprising a second groove at side of the rear panel adjacent to the natural stone panel, the second groove and the inner surface of the natural stone panel defining a cavity; a bottom of all or part of the first grooves or the first sunk-reliefs opposite to the inner surface of the natural stone panel in the cavity; a distance between the bottom of the first grooves or the first sunk-reliefs and the inner surface of the natural stone panel in the cavity opposite to the first grooves or the first sunk-reliefs is from 1 mm to 3 mm; the light source being disposed in the cavity; the cavity being filled with the curable transparent adhesive resin.

Preferably, the rear panel may be a cement panel, fired panel, or honeycomb panel.

Preferably, a heating unit may be provided in the first grooves, the first sunk-reliefs and/or the second groove.

To achieve the above technical objective, the present disclosure further provides a decorative stone panel, comprising a natural stone panel, a light source, and curable transparent adhesive resin; the natural stone panel comprising a plurality of first grooves or first sunk-reliefs at an outer surface of the natural stone panel, and comprising one or more third grooves or third counter-reliefs at an inner surface of the natural stone panel; the one or more third grooves or third counter-reliefs opposite to the first grooves or the first sunk-reliefs, or a bottom of a plurality of the first grooves or first sunk-reliefs directly opposite to a bottom of the one or more third grooves or third counter-reliefs; a distance between the bottom of the first grooves or the first sunk-reliefs and the bottom of the one or more third grooves or third counter-reliefs being from 1 mm to 3 mm; the light source being disposed in the one or more third grooves or third counter-reliefs, or the light source being disposed outside the inner surface of the natural stone panel and directly opposite to the one or more third grooves or third counter-reliefs; the one or more third grooves or third counter-reliefs being filled with the curable transparent adhesive resin.

Preferably, the decorative stone panel may comprise a cover plate at an opening of the one or more third grooves or third counter-reliefs of the natural stone panel, and the cover plate and the one or more third grooves or third counter-reliefs defining a cavity; the light source provided in the cavity.

Preferably, the decorative stone panel may comprise a heating unit in the first grooves or first sunk-reliefs and/or the one or more third grooves or third counter-reliefs.

To achieve the above technical objective, the present disclosure also provides a decorative stone panel, comprising a natural stone panel, a light source, and curable transparent adhesive resin; the natural stone panel comprising first grooves at an outer surface thereof, the first grooves forming a figure, an inner contour coating area for applying coloring pigments being provided along an inner contour of the first grooves, and an outer contour coating area for applying coloring pigments being provided along an outer contour of the first grooves on the outer surface of the natural stone panel; the natural stone panel comprising a third groove at an inner surface thereof opposite to the first groove; the natural stone panel comprising the light source in the third groove, and a cover plate for covering the third groove, the cover plate and the third groove defining a cavity therebetween, and the third groove being filled with the curable transparent adhesive resin.

Preferably, the inner contour coating area may be at a bottom edge of the first grooves or at the bottom edge of the first grooves and aside surface of the first grooves.

Preferably, the first grooves may be provided with a step for connecting the bottom surface and the side surface along the inner contour thereof; the inner contour coating area is on the surface of the step, or the inner contour coating area is on the surface of the step and the side surface of the first grooves.

Preferably, an inner annular groove may be formed along the inner contour of the first grooves for connecting the bottom surface and the side surface; the inner contour coating area is on the surface of the inner annular groove or the inner contour coating area is on the surface of the inner annular groove and the side surface of the first grooves.

Preferably, the outer surface of the natural stone panel may be provided with an outer annular groove along the outer contour of the first grooves, and the outer annular groove forms the outer contour coating area.

Preferably, a heating unit may be provided in the first grooves and/or the third groove.

Preferably, the coloring pigment may be a photoluminescent material or a pigment blended with the photoluminescent material.

Preferably, a shape of the third groove may correspond to a shape of the first grooves; and a side of the third groove may be covered with a layer of an opaque material.

Preferably, the light source may be affixed to the cover plate, or the light source may be affixed in the curable transparent adhesive resin.

Preferably, the cover plate may be an aluminum plate or a plastic plate.

Preferably, the curable transparent adhesive resin may be mixed with a pigment, and/or, the curable transparent adhesive resin may be mixed with a photoluminescent material.

Preferably, the curable transparent adhesive resin may be an epoxy adhesive resin, polyurethane adhesive resin, or unsaturated polyester adhesive resin.

Preferably, the light source may be connected to a battery or an external power supply through the electric wires.

Preferably, the light source may be an ultraviolet light source or a color light source.

Preferably, an emitting time of the light source may be controlled by a time controller.

Preferably, the natural stone panel may be made of natural granite.

As compared with conventional techniques, the beneficial effects of the embodiments disclosed in the present disclosure include: by filling curable transparent adhesive resin on one side of the light-transmissive surface of natural stone panel, the light-transmissive surface is less prone to damage during thinning processing, and still allow transmission of light from the light source through the light-transmissive surface of the natural stone panel.

DETAILED DESCRIPTION OF PREFERRED EMBODIMENTS

In order to make the objectives, technical solutions, and advantages of this disclosure clearer, the following further describes embodiments of this disclosure in detail with reference to the accompanying drawings. It should be understood that specific embodiments described herein are only for illustration purposes, but not for limiting the present invention.

Embodiment 1

Figure 1:
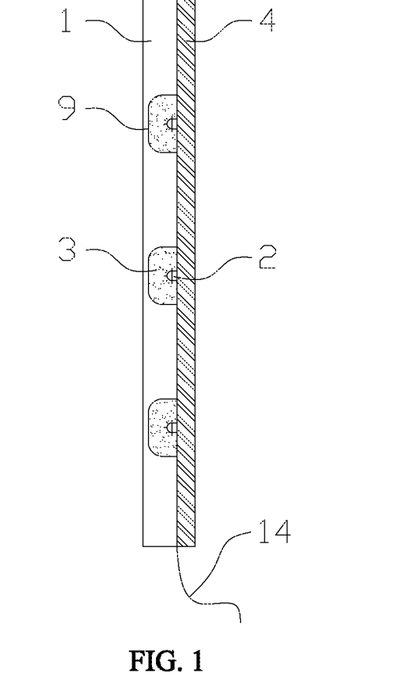
FIG. 1 is a schematic structural diagram of Embodiment 1 provided by this disclosure.

With reference to FIG. 1, a decorative stone panel includes a natural stone panel 1, a ceramic tile 4, a light source 2, and curable transparent adhesive resin 3. The ceramic tile 4 is adhered to the inner surface of the natural stone panel 1. The natural stone panel 1 has a plurality of third counter-reliefs 9 at the inner surface of the natural stone panel 1. The thickness of the stone material at the bottom of the third counter-reliefs 9 is from 1 mm to 3.5 mm. The plurality of third counter-reliefs 9 form a figure. The third counter-reliefs 9 and the ceramic tile 4 defines a cavity therebetween. The cavity is filled with the curable transparent adhesive resin 3, which is disposed adjacent to the third counter-reliefs 9. The light source 2 is disposed in the cavity and connected with electric wires 19. The figure formed by the counter-reliefs 9 is invisible when the light source 2 in the cavity is not emitting light but becomes visible when the light source 2 emits light.

Preferably, in order to save resources and reduce the overall weight of the ceramic tile 4, the ceramic tile 4 may have a second groove 8 opposite to the third counter-reliefs 9, and the light source 2 may be disposed in the second groove 8. Alternatively, the ceramic tile 4 may comprise a plurality of ceramic tiles each corresponding to one of the plurality of third counter-reliefs 9 and being disposed at an opening of the corresponding third counter-relief 9.

Embodiment 2

Figure 2:
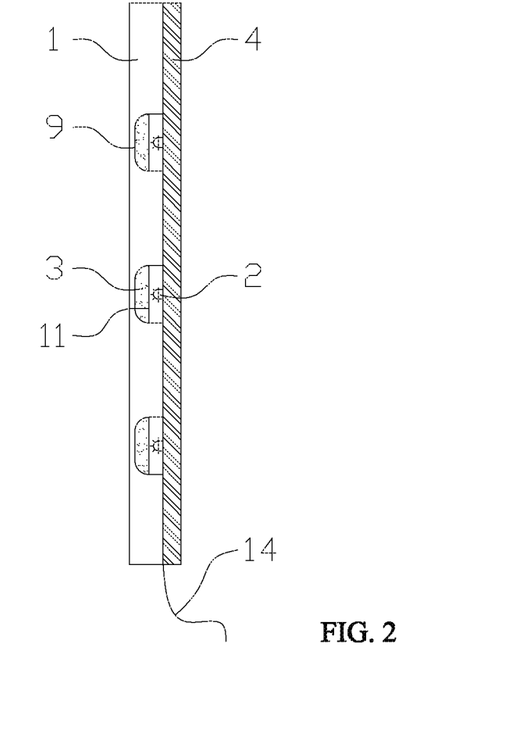
FIG. 2 is a schematic structural diagram of Embodiment 2 provided by this disclosure.

Embodiment 2 provides a decorative stone panel, which is further improved on the basis of Embodiment 1. As revealed in FIG. 2, the decorative stone panel includes a pigment layer 11 between the curable transparent adhesive resin 3 and the light source 2. Even though the pigment layer 11 is closely adjacent to the inner surface of the third counter-reliefs 9, the pigment layer 11 will not have any visible effect when the light source 2 is not emitting light, but when the light source 2 is emitting light, the pigment layer 11 renders the figure seen through the curable transparent adhesive resin 3 a colored figure.

Embodiment 3

Figure 3:
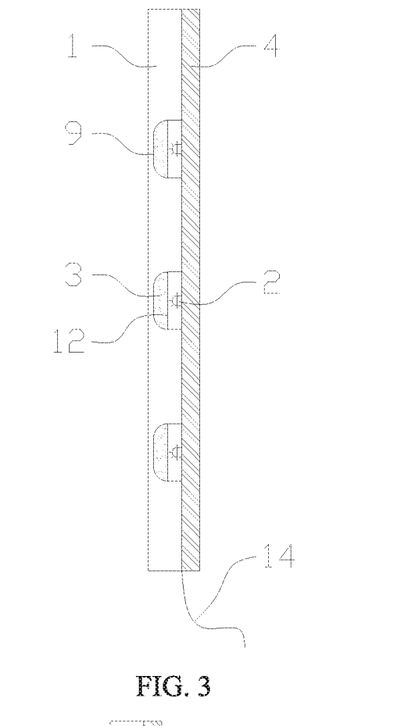
FIG. 3 is a schematic structural diagram of Embodiment 3 provided by this disclosure.

Embodiment 3 provides a decorative stone panel, which is further improved on the basis of Embodiment 2. As revealed in FIG. 3, the decorative stone panel includes a light-transmissive colored plate 12 between the third counter-reliefs 9 and the light source 2. When the light source 2 is emitting light, the ceramic tile 4 exhibits a colored figure, thus increasing the visual effects of the ceramic tile 4.

Embodiment 4

Figure 4:
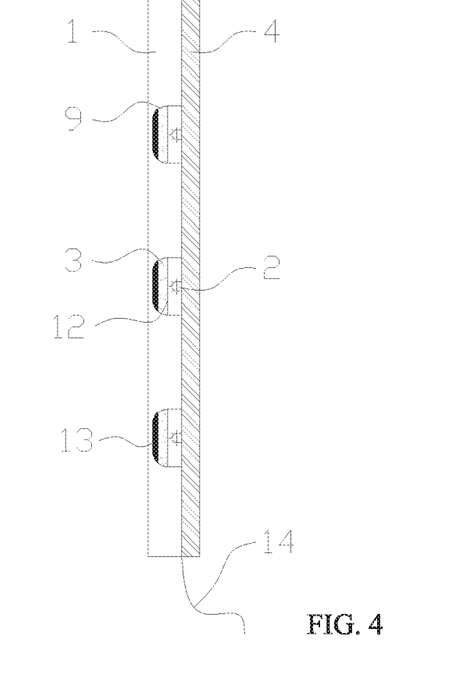
FIG. 4 is a schematic structural diagram of Embodiment 4 provided by this disclosure.

Embodiment 4 provides a decorative stone panel, which is further improved on the basis of Embodiment 2 and is different from Embodiment 3. As revealed in FIG. 4, the decorative stone panel includes a photoluminescent material 13 in the third counter-reliefs 9. When the light source 2 in the cavity is not emitting light and/or the photoluminescent material 13 in the third counter-reliefs 9 has not been activated to emit light, the figure is invisible. When the light source 2 in the cavity is emitting light and/or the photoluminescent material 13 in the third counter-reliefs 9 has been activated to emit light, the figure is visible.

In the above Embodiments 1 to 4, in order to facilitate the installation of the electric wires 19, the ceramic tile 4 may have a notch or a drill hole, and the electric wires 19 may be connected to a power source through the notch or the drill hole.

In the above Embodiments 1 to 4, the natural stone panel 1 has a flat outer surface, and can be polished using an automatic polishing machine, with high efficiency, reduced labor, and good effect.

In the above Embodiments 1 to 4, the decorative stone panel may include a heating unit in the third counter-reliefs 9 and/or the second groove 8, so the decorative stone panel may also be used to provide thermal energy. When the decorative stone panel is used for indoor decoration, the decorative stone panel may be used to provide floor heating or wall heating. When the decorative stone panel is used for outdoor decoration, such as on the road surface of sidewalks or the like, the decorative stone panel can provide heat to melt snow in cold weather.

Embodiment 5

Figure 5:
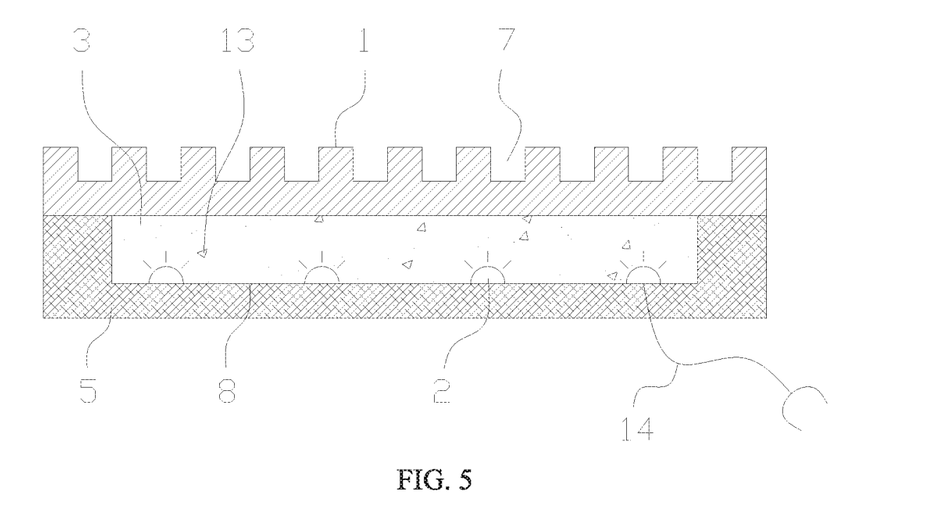
FIG. 5 is a schematic structural diagram of Embodiment 5 provided by this disclosure.
Figure 6:
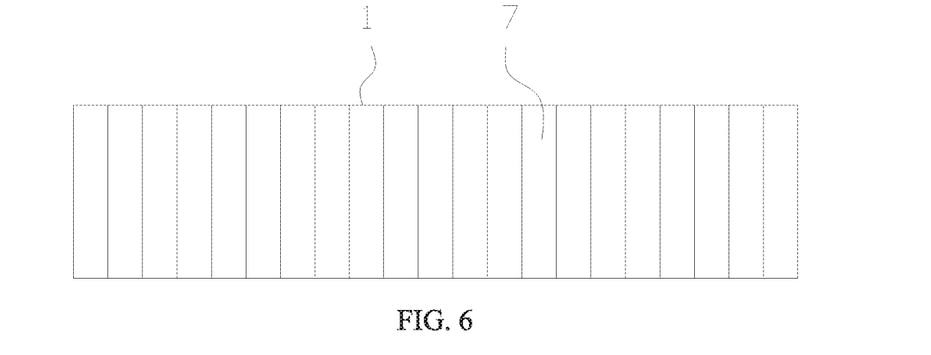
FIG. 6 is a top view of FIG. 5.

With reference to FIG. 5 and FIG. 6, a decorative stone panel includes a natural stone panel 1, a rear panel 5, a light source 2, and curable transparent adhesive resin 3. The natural stone panel 1 includes a plurality of first grooves 7 or first sunk-reliefs at the outer surface of the natural stone panel 1, and a flat surface at the inner surface of the natural stone panel 1. The inner surface of the natural stone panel 1 is bonded to the rear panel 5. The rear panel 5 has a second groove 8 at the side of the rear panel 5 adjacent to the natural stone panel 1. The second groove 8 and the inner surface of the natural stone panel 1 defines a cavity. The bottom of all or part of the first grooves 7 or the first sunk-reliefs are opposite to the inner surface of the natural stone panel 1 in the cavity. The distance between the bottom of the first grooves 7 or the first sunk-reliefs and the inner surface of the natural stone panel 1 in the cavity opposite to the first grooves 7 or the first sunk-reliefs is from 1 mm to 3 mm. The light source 2 is disposed in the cavity. The cavity is filled with the curable transparent adhesive resin 3.

When used during the day with sunlight, the first grooves 7 or the first sunk-reliefs can serve as a regular signage. At night, or when the environmental light is dim, the light source 2 in the cavity can be turned on, because the bottom of the first grooves 7 or the first sunk-reliefs that faces the inner surface of the natural stone panel 1 in the cavity allows improved light transmission, the first grooves 7 or the first sunk-reliefs can provide a lighted signage.

Depending on the light transmittance of the natural stone material used, the distance between the bottom of the first grooves 7 or the first sunk-reliefs and the inner surface of the natural stone panel 1 can be adjusted in the range of 1 mm to 3 mm. To reduce the thickness of the natural stone panel 1 to less than 1 mm would increase processing difficulties, increase the defective product rate and waste of resources. If the thickness of the natural stone panel 1 is thicker than 3 mm, the stone panel is not light transmissive or has poor light transmission, which negatively affects the quality of the entire product.

The purpose of filling the cavity with the curable transparent adhesive resin 3 is to ensure that the natural stone panel 1 is less prone to be damaged or fragmented during processing, installation, and use.

Disposing the light source 2 in the cavity can avoid increasing the overall size of the decorative natural stone panel and protect the light source 2 from damage.

Since the natural stone panel 1 has improved light transmission only at the bottom of the first sunk-reliefs or the first grooves 7, and under normal circumstances during use the bottom of the first sunk-reliefs or the first grooves 7 is less prone to external damage, the lifetime of the decorative natural stone panel is increased.

In a more specific implementation of the Embodiment 5, the rear panel 5 may be a cement panel, fired panel, or honeycomb panel. The second groove 8 can be prefabricated on the cement panel, fired panel, or honeycomb panel, which provides structural stability for the natural stone panel 1 and improves manufacture efficiency.

In another more specific implementation of the Embodiment 5, a heating unit may be provided in the first grooves 7, the first sunk-reliefs and/or the second groove 8, so that the decorative stone panel can serve to provide thermal energy. When the decorative stone panel is used for indoor decoration, the decorative stone panel may be used to provide floor heating or wall heating. When the decorative stone panel is used for outdoor decoration, such as on the road surface of sidewalks or the like, the decorative stone panel can provide heat to melt snow in cold weather.

Embodiment 6

Figure 7:
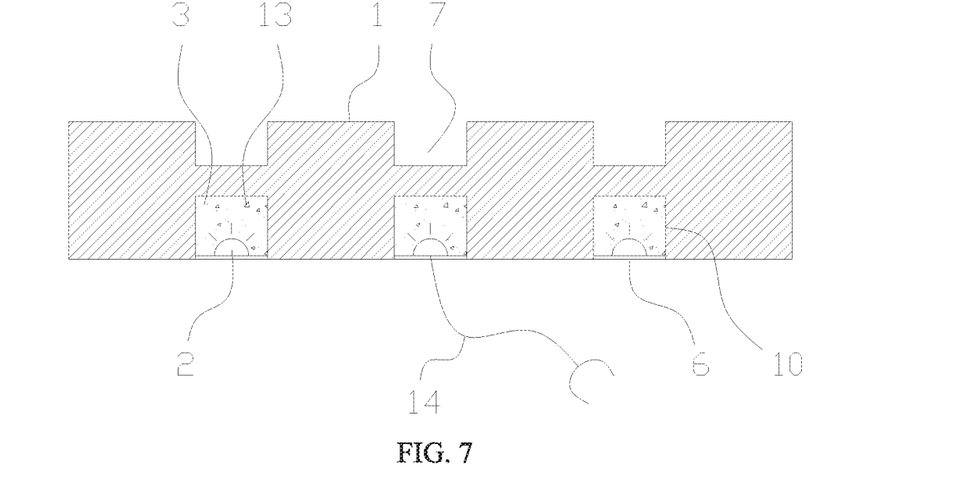
FIG. 7 is a schematic structural diagram of Embodiment 6 provided by this disclosure.
Figure 8:
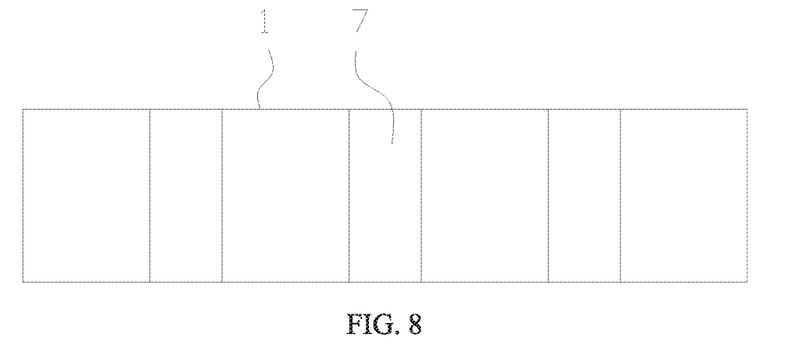
FIG. 8 is a top view of FIG. 7.

With reference to FIG. 7 and FIG. 8, a decorative stone panel includes a natural stone panel 1, a light source 2, and curable transparent adhesive resin 3. The natural stone panel 1 has a plurality of first grooves 7 or first sunk-reliefs at an outer surface of the natural stone panel 1, and one or more third grooves 10 or third counter-reliefs at an inner surface of the natural stone panel 1. The one or more third grooves 10 or third counter-reliefs are opposite to the first grooves 7 or the first sunk-reliefs. The distance between the bottom of the first grooves 7 or the first sunk-reliefs and the bottom of the one or more third grooves 10 or third counter-reliefs is from 1 mm to 3 mm. The light source 2 may be disposed in the one or more third grooves 10 or third counter-reliefs, or outside the inner surface of the natural stone panel 1 directly opposite to the one or more third grooves 10 or third counter-reliefs. The one or more third grooves 10 or third counter-reliefs are filled with the curable transparent adhesive resin 3.

When used during the day with sunlight, the first grooves 7 or the first sunk-reliefs can function as a regular signage. At night or when the environmental light is dim, the light source 2 in the cavity may be turned on, and because the bottom of the first grooves 7 or the first sunk-reliefs facing the inner surface of the natural stone panel 1 has improved light transmission, the first grooves 7 or the first sunk-reliefs can provide a lighted signage.

The reason to limit the distance between the bottom of the first grooves 7 or the first sunk-reliefs and the inner surface of the natural stone panel 1 within the range of 1 mm to 3 mm is that, to reduce the thickness of the natural stone panel 1 to less than 1 mm would increase processing difficulties, increase the defective product rate and waste of resources; but if the thickness of the natural stone panel 1 is thicker than 3 mm, the stone panel is not light transmissive or has poor light transmission, which negatively affects the quality of the entire product.

Filling the third grooves 10 or the third counter-reliefs with the curable transparent adhesive resin 3 can ensure the natural stone panel 1 is less prone to damage and fragmentation during processing, installation and use.

Disposing the light source 2 in the cavity can avoid increasing the overall size of the decorative natural stone panel and protect the light source 2 from damage.

Embodiment 7

Figure 9:
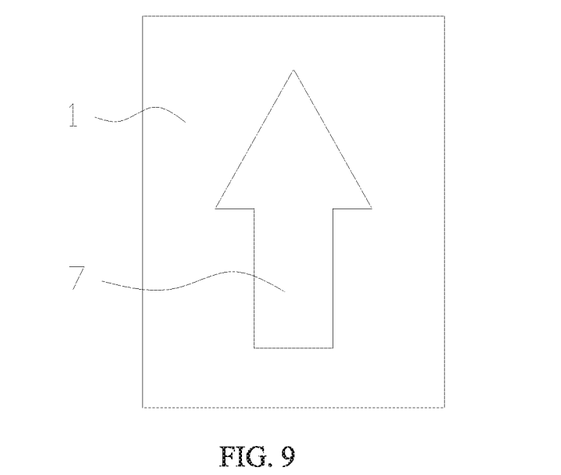
FIG. 9 is a top view of Embodiment 7 provided by this disclosure.

Embodiment 7 provides a decorative stone panel, which is further improved on the basis of Embodiment 6. As revealed in FIG. 9, the natural stone panel 1 includes a first sunk-reliefs at an outer surface of the natural stone panel 1. As depicted the shape of the first sunk-reliefs resembles an arrow, however, the first sunk-reliefs can also have another figure shape that can provide a signage.

Embodiment 8

Figure 10:
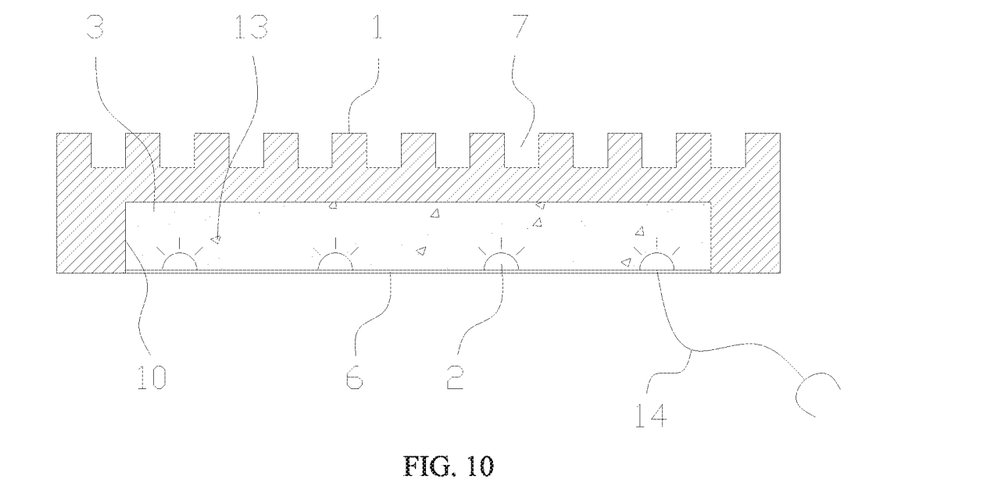
FIG. 10 is a schematic structural diagram of Embodiment 8 provided by this disclosure.

With reference to FIG. 10, a decorative stone panel includes a natural stone panel 1, a light source 2, and curable transparent adhesive resin 3. The natural stone panel 1 has a plurality of first grooves 7 or first sunk-reliefs at an outer surface of the natural stone panel 1, and one or more third grooves 10 or third counter-reliefs at an inner surface of the natural stone panel 1. The bottom of the first grooves 7 or first sunk-reliefs are directly opposite to the bottom of the one or more third grooves 10 or third counter-reliefs. The distance between the bottom of the first grooves 7 or the first sunk-reliefs and the bottom of the one or more third grooves 10 or third counter-reliefs is from 1 mm to 3 mm. The light source 2 is disposed in the one or more third grooves 10 or third counter-reliefs, or the light source 2 is disposed outside the inner surface of the natural stone panel 1 and directly opposite to the one or more third grooves 10 or third counter-reliefs. The one or more third grooves 10 or third counter-reliefs are filled with the curable transparent adhesive resin 3.

In the above Embodiments 6 to 8, the decorative stone panel may include a cover plate 6 at an opening of the one or more third grooves 10 or third counter-reliefs of the natural stone panel 1. The cover plate 6 and the one or more third grooves 10 or third counter-reliefs defines a cavity. The light source 2 may be provided in the cavity.

In the above Embodiments 6 to 8, the decorative stone panel may include a heating unit in the first grooves 7 or first sunk-reliefs and/or the one or more third grooves 10 or third counter-reliefs. When the decorative stone panel is used for indoor decoration, the decorative stone panel may be used to provide floor heating or wall heating. When the decorative stone panel is used for outdoor decoration, such as on the road surface of sidewalks or the like, the decorative stone panel can provide heat to melt snow in cold weather.

Embodiment 9

Figure 11:
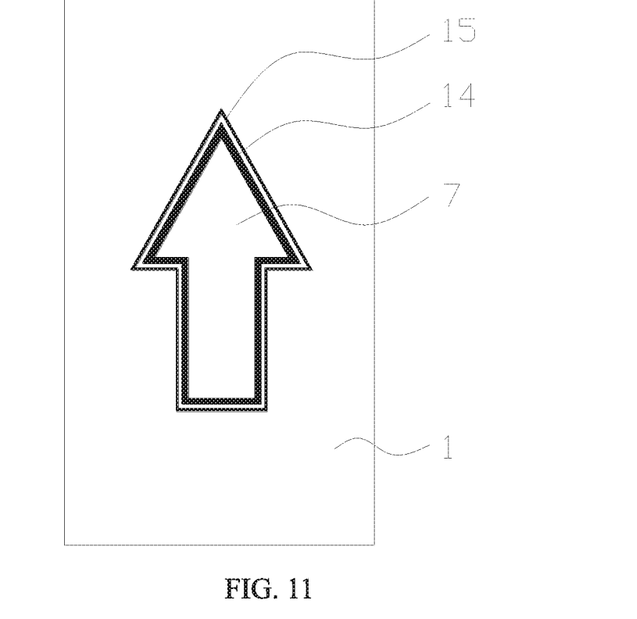
FIG. 11 is a top view of Embodiment 9 provided by this disclosure.
Figure 12:
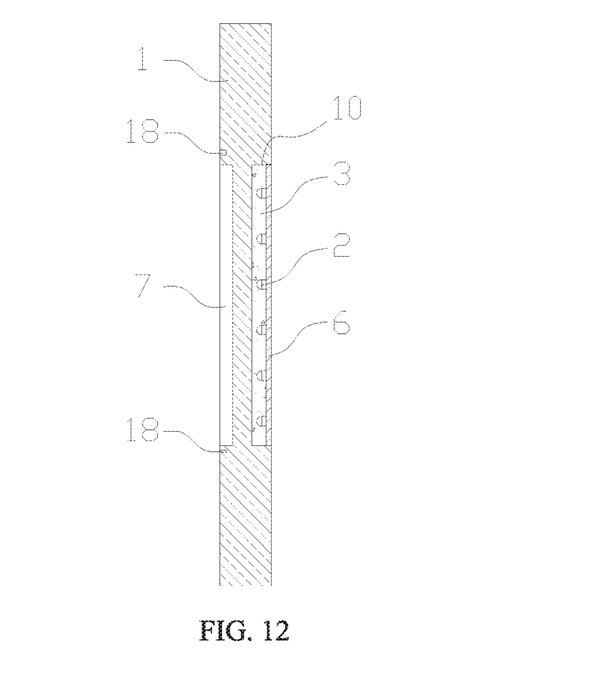
FIG. 12 is a schematic structural diagram of Embodiment 10 provided by this disclosure.

With reference to FIG. 11 and FIG. 12, a decorative stone panel includes a natural stone panel 1, a light source 2, and curable transparent adhesive resin 3. The natural stone panel 1 has first grooves 7 at an outer surface thereof. The first grooves 7 form a figure. An inner contour coating area 14 for applying coloring pigments is provided along an inner contour of the first grooves 7, and an outer contour coating area 15 for applying coloring pigments is provided along an outer contour of the first grooves 7 on the outer surface of the natural stone panel 1. The natural stone panel 1 has a third groove 10 at an inner surface thereof opposite to the first groove 7. The natural stone panel 1 also includes the light source 2 disposed in the third groove 7, and a cover plate 6 for covering the third groove 10. The cover plate 6 and the third groove 7 define a cavity therebetween, and the third groove 7 is filled with the curable transparent adhesive resin 3.

The first grooves 7 on the outer surface of the natural stone panel 1 may be shaped to provide various figures as desired, such as an arrow figure for guiding directions, or a visually pleasing figure of flowers, feet, or the like. The natural stone panel 1 of this embodiment is particularly suitable for laying on the ground in public places. Since the natural stone panel 1 can include various common materials, such as stone, wood, organic materials or composite materials, and many of these materials have their own natural surface patterns, these patterns can affect the human eye perception of the figure visible on the outer surface of the natural stone panel 1 provided by the first grooves 7. The present embodiment provides the inner contour coating area 14 and the outer contour coating area 15 for applying coloring pigments, which can provide clear outlines of the figure formed by the first grooves 7, allowing the human eye to perceive and recognize the figure more easily, quickly and accurately. Since the third groove 10 and the first grooves 7 are recessed toward each other, the distance between the bottom surface of the third groove 10 and the bottom surface of the first grooves 7 is relatively short, it allows the natural stone panel 1 to be light transmissive as long as the stone panel is formed of a typical natural stone material. For active lighting, the light source 2 in the third groove 10 of the natural stone panel 1 is turned on. The portion of the outer surface of the natural stone panel 1 corresponding to the first grooves 7 is light transmissive so it shows the lighted figure formed by the first grooves 7. In a dark environment, the lighted figure is visually pleasing, soft and easy on the eyes, and easily noticeable and recognizable.

Embodiment 10

Figure 13:
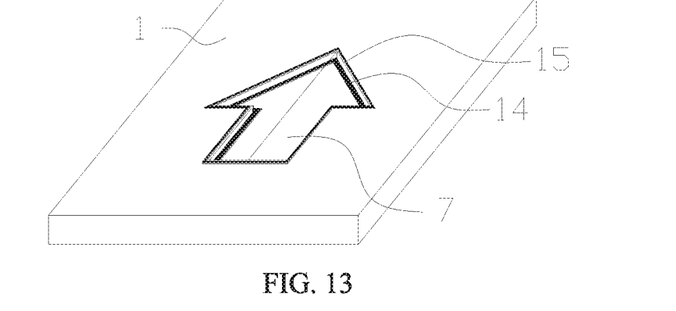
FIG. 13 is a three-dimensional structure diagram of Embodiment 10 provided by this disclosure.

Embodiment 10 provides a decorative stone panel, which is further improved on the basis of Embodiment 9. As revealed in FIG. 12 and FIG. 13, the inner contour coating area 14 is at a bottom edge of the first grooves 7 or at the bottom edge of the first grooves 7 and aside surface of the first grooves 7. Therefore, the painting surface is increased, and the figure outline is easier to recognize. The coating positions of these two coating areas are areas in the natural stone panel that are not prone to wear and tear, thus the lifetime of the coating is substantially prolonged. In a specific embodiment, the width of the inner contour coating area 14 can be as close as possible to the boundary between the bottom surface and the side surface of the first grooves 7 as long as the figure is still recognizable. For example, the width of the inner contour coating area 14 may be from 0.5 to 1 cm.

Embodiment 11

Figure 14:
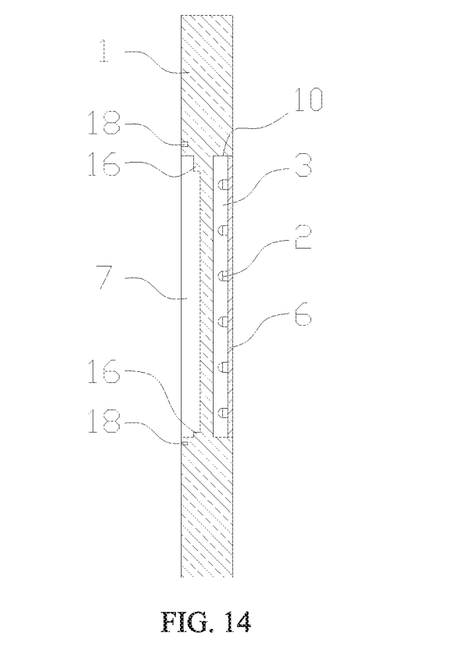
FIG. 14 is a schematic structural diagram of Embodiment 11 provided by this disclosure.
Figure 15:
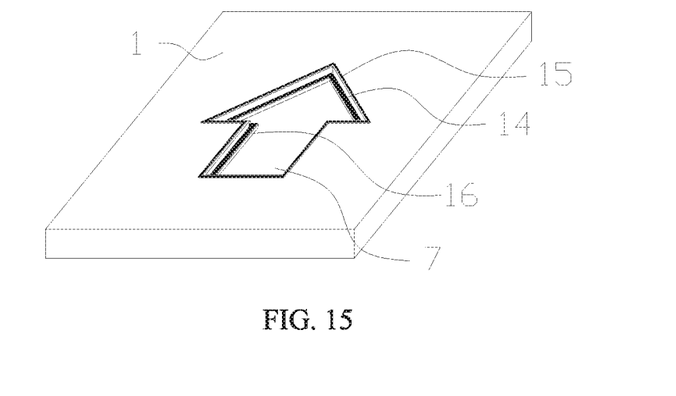
FIG. 15 is a three-dimensional structure diagram of Embodiment 11 provided by this disclosure.

Embodiment 11 provides a decorative stone panel, which is further improved on the basis of Embodiment 9. As revealed in FIG. 14 and FIG. 15, different from the Embodiment 10, the first grooves 7 are provided with a step 16 for connecting the bottom surface and the side surface along the inner contour thereof. The first grooves 7 are provided with a step 16 for connecting the bottom surface and the side surface along the inner contour thereof. The step 16 constitutes a layer of intermediate surface between the outer surface of the natural stone panel 1 and the bottom surfaces of the first grooves 7, which can be used to apply color rendering pigments. Compared with Embodiment 1 where the pigment is applied to the bottom of the first grooves 7, the coating in this embodiment is not too low so as to prevent perception by human eyes. Further, the coating is in an area not prone to wear and tear, so it is not easily damaged or worn off. Similarly, there are two possible specific implementations as follows: the inner contour coating area 14 is on the surface of the step 16, or the inner contour coating area 14 is on the surface of the step 16 and on the side surface of the first grooves 7.

Embodiment 12

Figure 16:
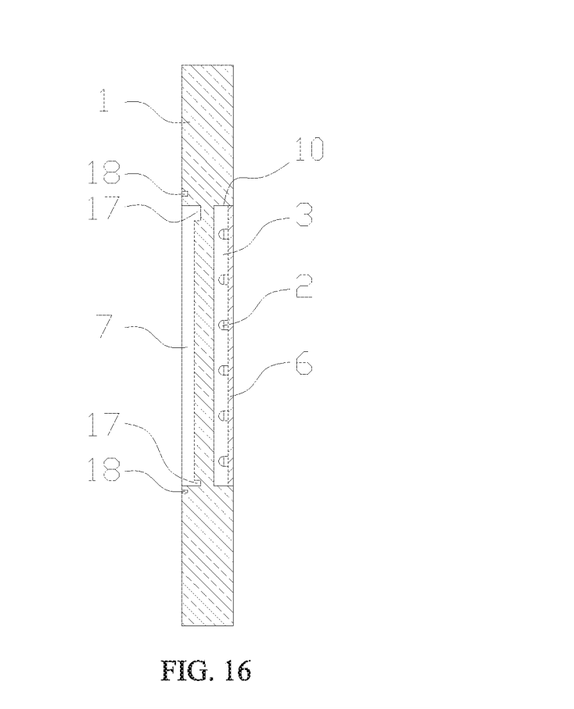
FIG. 16 is a schematic structural diagram of Embodiment 12 provided by this disclosure.
Figure 17:
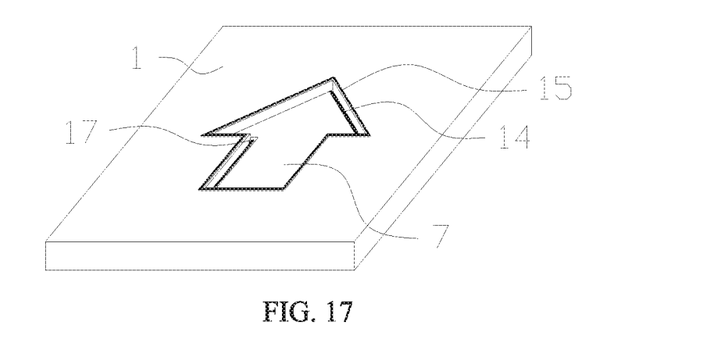
FIG. 17 is a three-dimensional structure diagram of Embodiment 12 provided by this disclosure.

Embodiment 12 provides a decorative stone panel, which is further improved on the basis of Embodiment 9. As revealed in FIG. 16 and FIG. 17, different from the Embodiment 10 and the Embodiment 11, an inner annular groove 17 is formed along the inner contour of the first grooves 7 for connecting the bottom surface and the side surface, which can be used to apply coloring pigments. This embodiment can further reduce tear and wear on the coating while ensuring the colored coating is still visible, as compared with the approach of applying the pigment to the bottom of the first grooves 7 in Embodiment 1. As compared to the approach of applying the pigment to the surface of the step 16 in Embodiment 2, in this embodiment the first grooves 7 for forming the figure do not need to be made very deep. That is, the height difference between the bottom of the first grooves 7 and the outer surface of the natural stone panel 1 can be relatively smaller, so it is more convenient for people to walk on the stone panels. Like in the other embodiments, the coatings may be applied with any of the following two specific options: the inner contour coating area 14 may be on the surface of the inner annular groove 17, or on both the surface of the inner annular groove 17 and the side surface of the first grooves 7.

In the above Embodiments 9 to 12, the outer surface of the natural stone panel 1 is provided with an outer annular groove 18 along the outer contour of the first grooves 7, and the outer annular groove 18 forms the outer contour coating area 15. This way, the coloring pigment is not on a surface subjected to much wear and tear, so the lifetime of the coating can be substantially extended.

In the above Embodiments 9 to 12, the heating unit provided in the first grooves 7, and/or the third groove 10, allow the decorative stone panel to supply heating. When the decorative stone panel is used in indoor, the decorative stone panel can provide floor heating or wall heating. When the decorative stone panel is used outdoor, such as on sidewalks or the like, the decorative stone panel may be used to melt snow in cold weather.

In the above Embodiments 9 to 12, the coloring pigment may be a photoluminescent material 13 or a pigment blended with the photoluminescent material 13.

It can be understood that, in the Embodiments 9 to 12, the profile or shape of the third groove 10 may correspond to the profile or shape of the first grooves 7. In order to improve light transmission and reduce unnecessary light scattering, the shape of the third groove 10 may conform to that of the first grooves 7, i.e., they may have the same profiles. In order to further reduce light scattering, the side of the third groove 10 may be covered with a layer of an opaque material. The figure outline can thus be defined with the opaque material to limit random light scattering. As a result, when the light source 2 is turned on, the boundaries of the lighted figure are sharper and the figure is better defined.

The light source 2 may be mounted with any of the following two options. The light source 2 may be mounted on the cover plate 6 or mounted in the curable transparent adhesive resin 3.

In the above Embodiments 6 to 12, the cover plate 6 may be an aluminum plate or a plastic plate. It can be fixed on the natural stone panel 1 with screws, braces, or adhesives and its surface may be flush with the outer surface of the stone panel. The resulting product can have a lighter weight and be easy to install.

In any of the previously described embodiments, the curable transparent adhesive resin 3 may be mixed with a coloring pigment, and/or, a photoluminescent material 13.

In any of the previously described embodiments, the curable transparent adhesive resin 3 may be an epoxy adhesive resin, polyurethane adhesive resin, or unsaturated polyester adhesive resin. The adhesive resin is used to improve and maintain the structural stability and integrity of the natural stone panel 1 during the process of forming the first grooves 7 on the natural stone material, particularly when the stone material under the light-transmitting surface is thin, so the light-transmitting layer under the light-transmitting surface is less prone to fragmentation or damage and can be made thinner without being broken. During assembly, the transparent adhesive resin 3 is applied in a fluid state, and while the adhesive resin 3 is still fluid the light source 2 may be arranged at selected intervals in the second groove or the second sunk-relief, or in the third groove 10 or the third counter-reliefs 9. It is also possible to embed only the top portion of the light source 2 in the transparent adhesive resin 3, or embed the entire light source 2 in the transparent adhesive resin 3 as long as the power wires or cords extend out of the adhesive resin. The adhesive resin is then cured, and cured adhesive resin will secure the light source 2 in place.

In any of the previously described embodiments, the light source 2 may be connected to a battery or an external power supply through the electric wires 14.

In any of the previously described embodiments, the light source 2 may be an ultraviolet light source 2 or a color light source, for improving the ornamental effects of the decorative stone panel.

In any of the previously described embodiments, the light source 2 may include light emitting diodes, and the light source 2 may be controlled by a time controller to adjust the light emitting times.

In any of the previously described embodiments, the natural stone panel 1 may be made of natural granite. With granite, the entire natural stone decorative panel can be strong and more wear-resistant, and suitable for outdoor use and use on the ground.

It is to be understood, however, that the above described embodiments of the present disclosure are not intended to limit the scope of the present disclosure. Various modifications and changes may be made in accordance with the technical solutions provided in the present disclosure, which are all intended to be included within the protection scope of the appended claims.

What is claimed is:

1. An assembly comprising:
a natural stone body comprising an outer surface and an opposite inner surface, the inner surface comprising one or more counter-reliefs forming a figure, the natural stone body having a thickness of 1 mm to 3.5 mm between the outer surface and the inner surface at the one or more counter-reliefs;
a cover plate covering the inner surface and the one or more counter-reliefs, the cover plate and the natural stone body defining a cavity therebetween; and
a light source disposed in the cavity and having a conductive connection for connecting the light source to a power source,
wherein the thickness between the outer surface and the inner surface at the one or more counter-reliefs is thinned such that the figure formed by the one or more counter-reliefs is invisible through the outer surface when the light source is off but becomes visible through the outer surface when the light source is turned on and emits light, and
wherein the one or more counter-reliefs are filled with transparent adhesive resin to improve structural stability and integrity of the natural stone body such that the natural stone body is less prone to damage or fragmentation at the one or more counter-reliefs.

2. The assembly of claim 1, wherein the cover plate comprises a ceramic tile, an aluminum plate, or a plastic plate.

3. The assembly of claim 2, wherein the cover plate comprises a groove facing the one or more counter-reliefs, and the light source is disposed in the groove.

4. The assembly of claim 2, wherein the cover plate comprises one or more ceramic tiles each covering one of the one or more counter-reliefs.

5. The assembly of claim 1, further comprising a pigment layer disposed between the transparent adhesive resin and the light source.

6. The assembly of claim 1, further comprising a light-transmissive colored plate disposed between the inner surface and the light source.

7. The assembly of claim 1, further comprising a photoluminescent material disposed in the cavity to allow the figure to be visible through the outer surface when the photoluminescent material is activated to emit light.

8. The assembly of claim 1, wherein the cover plate comprises an opening for connecting the conductive connection to the power source.

9. The assembly of claim 1, wherein the natural stone body is a panel and the outer surface is a flat surface.

10. The assembly of claim 1, wherein the outer surface is a curved surface.

11. The assembly of claim 1, wherein the outer surface comprises one or more grooves or reliefs.

12. The assembly of claim 1, wherein the outer surface comprises one or more sunk-reliefs.

13. The assembly of claim 12, wherein the one or more sunk-reliefs on the outer surface are positioned opposite to the one or more counter-reliefs on the inner surface.

14. The assembly of claim 1, further comprising a heating unit disposed in the cavity.

15. The assembly of claim 1, wherein the one or more counter-reliefs on the inner surface comprise sides coated with a layer of an opaque material to limit light scattering.

16. The assembly of claim 11, wherein the one or more grooves or reliefs on the outer surface comprise sides coated with a layer of an opaque material to limit light scattering.

17. The assembly of claim 7, wherein the photoluminescent material is mixed with the transparent adhesive resin.

18. The assembly of claim 1, wherein the transparent adhesive resin is an epoxy adhesive resin, polyurethane adhesive resin, or unsaturated polyester adhesive resin.

19. The assembly of claim 1, wherein the natural stone body is made of natural granite.

20. The assembly of claim 1, wherein the light source comprises an ultraviolet light source.

* * * * *